Sept. 13, 1966  J. FRANIA ET AL  3,272,220
HYDRAULIC PRESSURE REGULATING VALVE
Filed Jan. 30, 1963
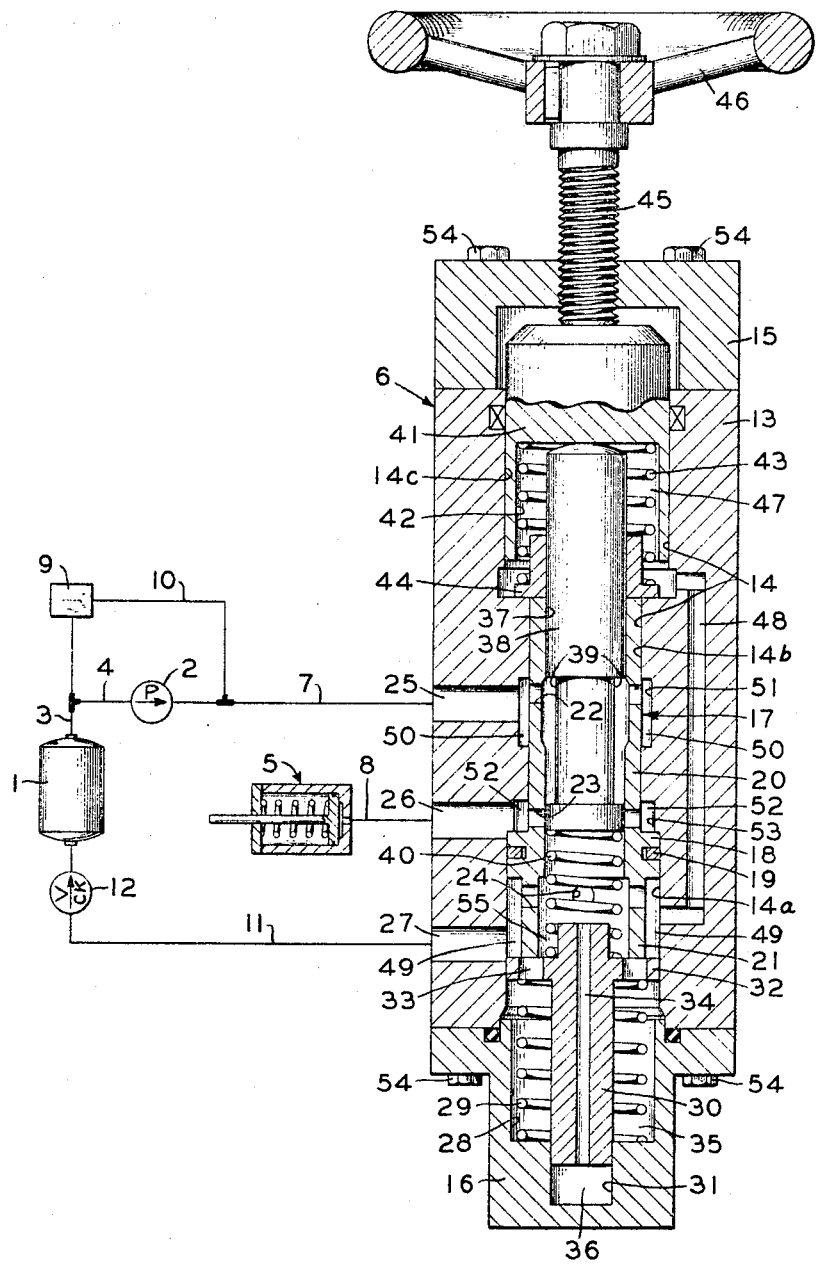
INVENTORS
JOSEF FRANIA
FRITZ SCHEELE
BY
A. A. Steinmiller
ATTORNEY United States Patent Office 3,272,220
Patented Sept. 13, 1966

3,272,220
HYDRAULIC PRESSURE REGULATING VALVE
Josef Frania and Fritz Scheele, Hannover, Germany, assignors to Westinghouse Bremsen-Gesellschaft m.b.H., Hannover, Germany
Filed Jan. 30, 1963, Ser. No. 255,029
Claims priority, application Germany, Feb. 7, 1962, W 31,634
2 Claims. (Cl. 137—116.5)

This invention relates to hydraulic pressure regulating valve apparatus and more particularly to a hydraulic pressure regulating valve controlled by a small adjusting pressure to regulate a high pressure source to accurately supply reduced delivery pressures therefrom at different stages as desired.

Conventional hydraulic pressure regulating valve devices for use with high pressures require an undesirably large manual adjusting force to regulate the reduced delivery pressures and at extremely high pressures are very unsensitive to small pressure regulation changes.

According to the invention, there is provided a manually operated hydraulic pressure regulating device operable responsively to a small manual adjusting pressure to accurately regulate, at different stages, delivery of a desired high hydraulic pressure for any required control purpose.

In the accompanying drawing the single figure shows partly in outline and partly in enlarged section the novel hydraulic pressure regulating valve device as included in a hydraulic pressure control system.

DESCRIPTION

As shown in the drawing, the hydraulic control system comprises a sump or non-pressurized reservoir 1 for supplying fluid to a pump 2 by way of pipes 3 and 4 for supply to an operating device shown herein as a piston device 5 under the control of the new and novel regulating device 6. Supply pipe 7 leads from the pump 2 to the regulating device 6 and a supply pipe 8 leads therefrom to the piston device 5. A unidirectional overflow valve 9 is connected by a pipe between the supply pipe 7 and the pipe 3 to accommodate excess fluid supplied to the supply pipe 7 by the pump 2. A return pipe 11 leads from the regulating device 6 by way of a unidirectional check valve 12 to the sump 1.

The regulating device 6 comprises a housing 13 having multi-diameter bore 14 extending concentrically therethrough and closed off at the top by a cover 15 and at the bottom by a hollow end cap 16. Slidably positioned axially within said bore 14 is a hollow control piston 17 having a piston head 18, with a sealing ring 19, slidable in a large diameter portion 14a of the bore 14, and a hollow piston stem 20 slidable in a small diameter portion 14b of the bore 14. A piston shank 21 extends in a non-engageable manner in the bore portion 14a away from the piston head 18 in a direction opposite from that of the piston stem 20. A plurality of radial ports 22, 23 and 24 are positioned in the walls of the control piston 17 in a manner to be slidably placed adjacent respective passages 25, 26 and 27 in the housing 13 for reasons explained hereinafter.

Interposed between the housing 13 and the end cap 16 in a bore 28 therein is a spring 29 encircling a spring guide 30 which extends into a guide bore 31 in said end cap 16. The spring 29 abuts the end of bore 28 in the end cap 16 on one end, and a flange 32 of the spring guide 30, slidably positioned in the bore 14a, on the other end. The flange 32 engages the piston shank 21 in such a manner that the biasing force of spring 29 is transmitted thereto. Ports 33 in the flange 32 and a passage 34 in the body of the spring guide 30 prevent build-up of leakage pressure on opposite sides of said guide in a spring chamber 35 and in an end chamber 36 below the spring guide 30.

Slidably positioned in a bore 37 in the hollow central piston 17 is a control slide valve 38 having an encircling control groove 39 of a length suitable to control establishment of communication between ports 22 and 23 in the piston stem 20. A spring 40 is interposed in the bore 37 between one end (the lower end as shown) of the slide valve 38 and the face of the flange 32 of the spring guide 30. The spring 40 biases the slide valve 38 upward such that the upper end thereof engages an adjusting piston 41. The adjusting piston 41 is slidably positioned in different diameter bore portion 14c of the bore 14 and has an internal bore 42, the bottom of which is engaged by the upper end of the slide valve 38. A spring 43 encircles the upper end of slide valve 38 and abuts a slide valve guide 44 and the adjusting piston 41, to bias said adjusting piston into constant engagement with a manually operated adjusting rod 45. The adjusting rod 45 is threaded through the cover 15 and adjusted easily with slight pressure by manual rotation of a handle device, shown as a hand wheel 46, secured thereto outside of the cover 15.

A chamber 47 formed by the adjusting piston 41 in the bore portion 14c is connected by a passage 48 in the housing 13 to a chamber 49 encircling the control piston shank 21 below the piston head 18. A chamber 50 is formed surrounding the piston stem 20 by a groove 51 in the bore portion 14b adjacent passage 25. A similar chamber 52 is formed surrounding the piston stem 20 adjacent the piston head 18 by a groove 53 in the bore portion 14b adjacent passage 26.

A plurality of securing means, such as screws 54, secure the several portions of the valve device together.

OPERATION

In operation, the fluid pump 2 is operated (by means not shown) to draw fluid from the sump 1 by way of pipes 3 and 4 to build up the pressure of the fluid to a high constant value to be delivered from said pump by way of supply pipe 7 to the regulating device 6 at the passage 25 and thence under predetermined pressure control by the regulating device 6 to an operating piston device 5.

Excess fluid in the supply pipe 7 is led off by pipe 10 and the unidirectional overflow valve 9 to the pipe 3 thereby preventing excessive pressure build-up in the supply pipe 7.

Manual clockwise rotation of the handle 46, requiring a minimum of manual force, causes the adjusting rod 45 to be threaded through the cover 15 against the adjusting piston 41 to move the adjusting piston 41 downward a desired distance representative of a particular desired pressure of fluid necessary at the operating piston device 5, by an operation described as follows:

Downward movement of the adjusting piston 41 against the forces of spring 43 causes a like downward movement of the control slide valve 38 against the force of spring 40 to effect a partial uncovering of the ports 23 by said control slide valve 38 and thereby establish communication between the supply pipe 7 and delivery pipe 8 by way of passage 25, chamber 50, ports 22, control groove 39, ports 23, chamber 52, and passage 26 such that fluid under pressure is supplied to the operating piston device 5. As the fluid pressure builds up in the operating piston device 5, a similar build-up occurs in chamber 52 acting on the piston head 18 to cause the piston head 18 and thus the hollow control piston 17 to move downward against the force of the control spring 29 acting through the media of the flange 32 and piston shank 21. When the fluid pressure in chamber 52 acting on the piston head 18 moves the control piston 17 downward a sufficient amount to cause the ports 23 to again be covered by the control slide valve 38, the fluid pressure supply communication just described is interrupted to lap off supply of fluid under pressure to the operating piston device 5.

It can thus be seen that the size of the opening between the ports 23 and the control groove 39 of the control slide valve 38 is the determining factor in the regulation of the degree of pressure supplied to the operating piston device 5, and the size of said opening is regulated by the downward movement of the control slide valve 38 relative to the piston 17 as regulated by the rotation of the handle 46 to effect such movement through the media of the adjusting rod 45 and the adjusting piston 41.

Once the control piston 17 has moved downward to lap the supply of fluid under pressure to the operating piston device 5, said piston 17 remains lapped. If, for any unknown and undesired reason, the fluid under pressure would tend to leak off or decrease at the operating piston device 5, the piston 17 in response to the force of the control spring 29 would move upward as said pressure decreased until the ports 23 were again partially opened to thereby automatically restore the lost pressure and then again lap the piston 17 as before described.

It is possible by some sudden undesired impulse of the pump during the supplying of fluid under pressure to the operating piston device 5 to overcharge said device relative to the pressure called for by the downward regulation of the control slide valve 38. This undesired overcharge would cause the control piston 17 to move downward out of the lap position described until the ports 23 are uncovered to open chamber 52 into a spring chamber 55 below the control slide valve 38, said chamber 55 being in communication with the non-pressurized sump or reservoir 1 by way of ports 24, chamber 49, passage 27, return pipe 11 and check valve 12 to thereby vent the aforesaid overcharge until the pressure in chamber 52 reduces to that desired as determined by the positioning of the control slide valve 38, at which time the control piston 17 will move upward to its lap position.

To reduce the pressure supplied to the operating piston device 5, the handle 46 is manually rotated counter-clockwise to move the adjusting rod 45 upward to permit the spring 43 to move the adjusting piston 41 upward and thereby permit the spring 40 to move the control slide valve 38 upward to uncover and open the ports 23 to the chamber 55 connected to the reservoir 1 to thereby vent the chamber 52 and thus the operating piston device 5 in accordance with the regulated upward movement of the control slide valve 38.

It can thus be seen that the small manual force required to reposition the control slide valve 38 will regulate the supplying and releasing of a large pressure to or from the operating piston device 5 by opening and closing of the ports 23 to pressure supply or venting as desired.

Having now described the invention, what we claim as new and desire to secure by Letters Patent, is:

1. A pressure regulating valve device for regulating the fluid pressure in a fluid circulatory systems having elements including a non-pressurized source of fluid, pressurizing pump means, an operating device and conduit means interconnecting said elements, said valve device comprising:

(a) a valve body having a bore therein with a supply passage, a delivery passage and a relief passage extending from said bore in longitudinally spaced relation therealong for connection, respectively, to the pressurizing pump means for supply of fluid under pressure therefrom, to the operating device for delivery of fluid under pressure thereto, and to the non-pressurized source of fluid for release of fluid under pressure thereto from the operating device, (b) a hollow control piston having a tubular body and a piston head slidably positioned within said bore of said valve body and having in the tubular body on one side of said piston head a supply port in constant communication with said supply passage and a delivery port in constant communication with said delivery passage, and a relief port in constant communication with said relief passage on the opposite side of said piston head, said piston head being subject on said one side to the fluid under pressure in said delivery passage and on the said opposite side to biasing forces of spring means, and (c) a control slide valve slidably positionable within the tubular body of said hollow control piston in a selected one of a plurality of positions to establish a first communication between said supply port and said delivery port and operable cooperatively with said hollow control piston upon movement of said hollow control piston responsively to fluid pressure in said delivery passage acting on the said piston head in opposition to said spring means to cut off said first communication, and operable cooperatively with said hollow control piston responsively to a further increase of fluid under pressure in said delivery passage acting on said piston head in opposition to said spring means to establish a second communication between said delivery port and said relief port, to thereby regulate to a certain pressure the pressure of the fluid delivered from said supply passage to said delivery passage of said valve body according to the selected one of said positions of the control slide valve.

2. A pressure regulating valve device, as claimed in claim 1, further characterized in that when said control slide valve is slidably positioned retrogressively from a selected one of said plurality of positions to a different one of said positions, it is operative cooperatively with said hollow control piston to establish said second communication between said delivery port and said relief port to effect a reduction of the fluid pressure in the delivery passage to a pressure lower than said certain pressure and regulation to such lower pressure according to the said different one of said positions thereof.

References Cited by the Examiner

UNITED STATES PATENTS

| | | | |
|---|---|---|---|
| 1,593,648 | 7/1926 | Berger | 137—116.5 |
| 2,524,264 | 10/1950 | Knox | 137—116.5 |
| 2,825,361 | 3/1958 | Seljos. | |
| 3,011,833 | 12/1961 | Stelzer | 137—116.3 X |

WILLIAM F. O'DEA, *Primary Examiner.*

CLARENCE R. GORDON, *Examiner.*